US011496576B2

(12) United States Patent
Yang et al.

(10) Patent No.: US 11,496,576 B2
(45) Date of Patent: Nov. 8, 2022

(54) QUICK RELAY TRAFFIC MANAGEMENT FOR CLOUD MESSAGING

(71) Applicant: Apple Inc., Cupertino, CA (US)

(72) Inventors: Yan Yang, San Jose, CA (US); Joe S. Abuan, Cupertino, CA (US); Thuy Park, San Jose, CA (US); Jin Hyung Park, Cupertino, CA (US); Berkat S. Tung, San Jose, CA (US); Pierre J. De Filippis, San Jose, CA (US); Nicholas J. Circosta, Mountain View, CA (US); Daniel B. Pollack, San Jose, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 17/027,639

(22) Filed: Sep. 21, 2020

(65) Prior Publication Data

US 2021/0006627 A1    Jan. 7, 2021

Related U.S. Application Data

(63) Continuation of application No. 15/713,360, filed on Sep. 22, 2017, now Pat. No. 10,785,313.

(Continued)

(51) Int. Cl.
*H04L 67/141* (2022.01)
*H04W 40/12* (2009.01)
*H04W 48/02* (2009.01)
*H04B 7/155* (2006.01)
*H04L 67/56* (2022.01)
(Continued)

(52) U.S. Cl.
CPC ........... *H04L 67/141* (2013.01); *H04B 7/155* (2013.01); *H04L 67/56* (2022.05); *H04L 67/561* (2022.05); *H04W 40/12* (2013.01); *H04W 48/02* (2013.01); *H04W 76/10* (2018.02); *H04L 67/01* (2022.05);
(Continued)

(58) Field of Classification Search
CPC ........ H04L 67/141; H04L 67/26; H04W 4/80; H04W 48/12
See application file for complete search history.

(56) References Cited

U.S. PATENT DOCUMENTS 9,325,941 B2   4/2016   Yang et al.
9,680,646 B2   6/2017   Nadathur et al.
(Continued)

*Primary Examiner* — Shirley X Zhang
(74) *Attorney, Agent, or Firm* — Dickinson Wright RLLP

(57) ABSTRACT

A quick relay communication protocol is used by an initiating communication device (such as a wearable electronic device, e.g., a smart watch) and/or a recipient communication device (such as a companion electronic device to the wearable electronic device, e.g., a smart phone, a tablet computer or a laptop computer) to selectively communicate messages via different communication channels. Based on available connections and a communication constraint associated with a message, a processor executing a program module in an application layer in the initiating communication device provides transmission instructions to an interface circuit in the initiating communication device, which transmits a message to the recipient communication device based on the transmission instructions. When there are currently no available connections and the message is eligible to be communicated through a cloud-based relay server, the processor establishes a cloud-based connection with the recipient communication device via the relay server.

20 Claims, 9 Drawing Sheets

Related U.S. Application Data

(60) Provisional application No. 62/399,162, filed on Sep. 23, 2016, provisional application No. 62/399,163, filed on Sep. 23, 2016, provisional application No. 62/399,159, filed on Sep. 23, 2016.

(51) Int. Cl.
  *H04L 67/561* (2022.01)
  *H04W 76/10* (2018.01)
  *H04L 67/01* (2022.01)
  *H04L 67/55* (2022.01)
  *H04W 4/80* (2018.01)
  *H04W 84/12* (2009.01)

(52) U.S. Cl.
  CPC .............. *H04L 67/55* (2022.05); *H04W 4/80* (2018.02); *H04W 84/12* (2013.01)

(56) References Cited

U.S. PATENT DOCUMENTS

| | | | |
|---|---|---|---|
| 9,716,969 | B2 | 7/2017 | Song |
| 10,028,309 | B2 | 7/2018 | Aliyar |
| 10,057,062 | B2 | 8/2018 | Nadathur et al. |
| 10,084,904 | B2 | 9/2018 | De Filippis et al. |
| 2004/0111652 | A1 | 6/2004 | Shoaib et al. |
| 2004/0254993 | A1* | 12/2004 | Mamas ............... H04L 67/2814 709/206 |
| 2006/0268712 | A1* | 11/2006 | Deen ..................... H04L 45/12 370/235 |
| 2011/0064018 | A1 | 3/2011 | Hottinen |
| 2014/0156854 | A1 | 6/2014 | Gaetano, Jr. |
| 2014/0188837 | A1 | 7/2014 | Zhou et al. |
| 2015/0172333 | A1 | 6/2015 | Lindström et al. |
| 2015/0263880 | A1 | 9/2015 | Wang et al. |
| 2015/0350599 | A1 | 12/2015 | Yang et al. |
| 2015/0365986 | A1* | 12/2015 | Lee .................... H04W 72/085 370/329 |
| 2016/0135042 | A1 | 5/2016 | Netto et al. |
| 2016/0182803 | A1 | 6/2016 | Song |
| 2016/0191461 | A1 | 6/2016 | Wang |
| 2016/0219435 | A1 | 7/2016 | Mistry et al. |
| 2016/0366195 | A1 | 12/2016 | Pattekar et al. |
| 2016/0380967 | A1 | 12/2016 | Moore et al. |
| 2016/0381536 | A1 | 12/2016 | Li et al. |
| 2017/0223579 | A1 | 8/2017 | Lee et al. |
| 2017/0289787 | A1 | 10/2017 | Yu et al. |
| 2018/0041943 | A1 | 2/2018 | Visuri et al. |
| 2018/0091215 | A1 | 3/2018 | Yang et al. |
| 2018/0091600 | A1 | 3/2018 | Yang et al. |
| 2018/0091601 | A1 | 3/2018 | Yang et al. |

* cited by examiner

QUICK RELAY TRAFFIC MANAGEMENT FOR CLOUD MESSAGING

CROSS-REFERENCE TO RELATED APPLICATIONS

This Application is a continuation of U.S. patent application Ser. No. 15/713,360, entitled "QUICK RELAY TRAFFIC MANAGEMENT FOR CLOUD MESSAGING", filed Sep. 22, 2017, issued Sep. 22, 2020 as U.S. Pat. No. 10,785,313, which claims the benefit of U.S. Provisional Patent Application No. 62/399,162, entitled "QUICK RELAY SESSION MANAGEMENT PROTOCOL" filed Sep. 23, 2016, U.S. Provisional Patent Application No. 62/399,159, entitled "QUICK RELAY INTERFACE AND TRANSPORT SELECTION" filed Sep. 23, 2016, and U.S. Provisional Patent Application No. 62/399,163, entitled "QUICK RELAY TRAFFIC MANAGEMENT FOR CLOUD MESSAGING" filed Sep. 23, 2016, the contents of all of which are incorporated by reference herein in their entirety for all purposes.

FIELD

The described embodiments relate, generally, to wireless communication among electronic devices, including selectively communicating messages via different communication channels, which may include a relayed communication channel between the electronic devices via a relay server, based on available connections.

BACKGROUND

Many electronic devices often work in tandem with each other. For example, wearable or accessory electronic devices (such as smart watches) often communicate data, configuration information and/or control information with a companion electronic device (such as a smart phone, a tablet computer or a laptop computer) via a short-range communication protocol, such as Bluetooth® (from the Bluetooth Special Interest Group in Kirkland, Wash.).

However, when the companion electronic device is not proximate to the wearable electronic device, communication via Bluetooth may not be possible. In principle, the companion electronic device and the wearable electronic device can communicate with each other via an intermediate electronic device. For example, the companion electronic device and the wearable electronic device can each communicate with a cloud-based service via an access point in a wireless local area network (WLAN) that is compatible with an Institute of Electrical and Electronics Engineers (IEEE) 802.11 standard (which may also be referred to as 'Wi-Fi').

In practice, indirect communication via a cloud-based service can be time consuming because of long set-up time needed to establish connections and latency associated with signaling overhead. These time delays may degrade the performance or disrupt time-sensitive applications that are executing on the wearable electronic device and/or the companion electronic device. Moreover, communication via a cloud-based service may not be allowed for some messages because of security concerns.

SUMMARY

Embodiments relating to an initiating communication device that selectively communicates messages via different communication channels are described. During operation, a processor executing a program module in an application layer in the initiating communication device may receive a message from a queue in the initiating communication device. The processor may determine connections available to an interface circuit in the initiating communication device and a communication constraint associated with the message. Based on the available connections and the communication constraint, the processor may provide transmission instructions to the interface circuit, which transmits the message to a recipient communication device based on the transmission instructions.

The communication constraint may include, for example, whether the message is eligible to be communicated through a cloud-based relay server. When the message is not eligible to be communicated through a cloud-based connection via the relay server, the message is transmitted to the recipient communication device using a different connection than via the relay server. In some embodiments, the different connection includes a local interface, such as a Bluetooth connection or a Wi-Fi connection via an access point.

Moreover, the available connections may include the Bluetooth connection with the recipient communication device, the Wi-Fi connection with the recipient communication device via the access point, and/or the cloud-based connection with the recipient communication device via the relay server. When there are currently no available connections and the message is eligible to be communicated through the cloud-based relay server, the processor may establish the cloud-based connection with the recipient communication device via the relay server. Alternatively, when the Wi-Fi connection is available, the Bluetooth connection is unavailable, and the cloud-based connection to the recipient communication device via the relay server is unavailable, the message may be transmitted using the Wi-Fi connection. Furthermore, when the Bluetooth connection is available, the message may be transmitted using Bluetooth. Additionally, when the message is eligible to be communicated through the cloud-based relay server and there is no currently available cloud-based connection, the processor may establish the cloud-based connection with the recipient communication device via the relay server.

In some embodiments, when the message includes control traffic for the cloud-based connection with the recipient communication device via the relay server, the message is transmitted using Wi-Fi. Alternatively, in some embodiments, when the message includes the control traffic, the message is transmitted using the Wi-Fi connection and the cloud-based connection.

Note that establishing the cloud-based connection may include performing the operations of: transmitting, to an allocation server, an allocate request for allocation of the relay server; receiving, from the allocation server, an allocate response with information identifying the relay server (such as an address of the relay server); transmitting, to the relay server, a binding request to bind the initiating communication device and the relay server in the cloud-based connection; and receiving, from the relay server, a binding response.

Moreover, the allocate request may be communicated to the allocation server via an intermediate server. In some embodiments, prior to transmitting the allocate request, the initiating communication device sends, to the intermediate server, an invitation request to establish a communication session via the relay server. Furthermore, the binding request may specify a transport type for a connection between the initiating communication device and the relay server in the communication session and/or the binding response may specify a channel number for the communication session. Additionally, the first connection indication for the communication session may specify the transport type and a radio access technology.

Note that the initiating communication device may include memory that stores the program module.

Other embodiments provide the relay server or the recipient communication device.

Still other embodiments provide a computer-program product for use with the initiating communication device, the recipient communication device or the relay server. This computer-program product includes instructions for at least some of the aforementioned operations (or corresponding counterpart operations) performed by the initiating communication device, the recipient communication device or the relay server.

Still other embodiments provide a method for selectively communicating a message. The method includes at least some of the aforementioned operations (or corresponding counterpart operations) performed by the initiating communication device, the recipient communication device or the relay server.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
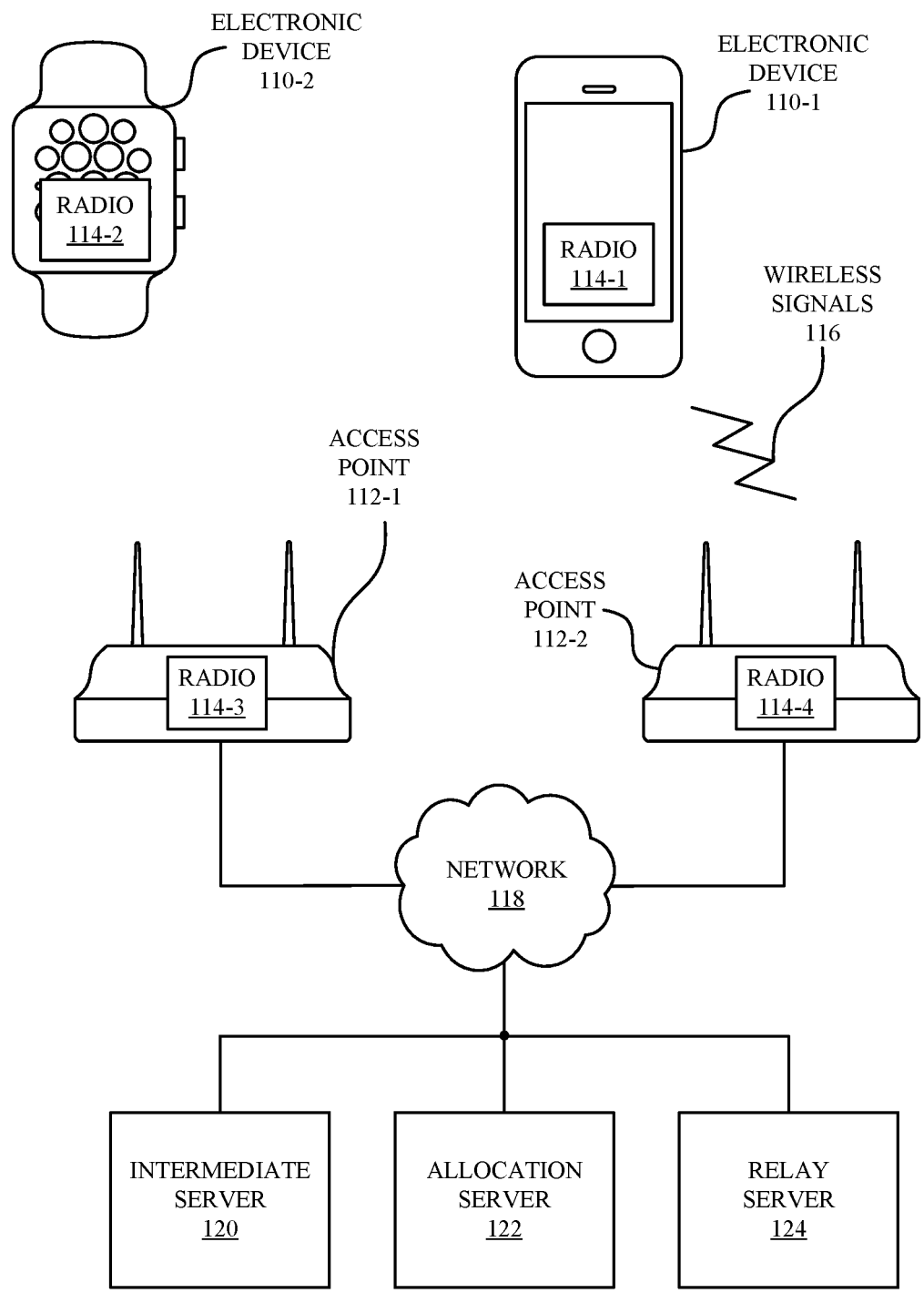
FIG. 1 is a block diagram illustrating an example of electronic devices communicating wirelessly.

Table 1 presents an example of a message-enqueue technique that is used by a given communication device.

Table 2 presents an example of a packet-tagging technique for control traffic that is used by a given communication device.

Table 3 presents an example of a packet-tagging technique for messaging traffic that is used by a given communication device.

Table 4 presents an example of a packet-handling technique for messaging traffic that is used by a given communication device.

Note that like reference numerals refer to corresponding parts throughout the drawings. Moreover, multiple instances of the same part are designated by a common prefix separated from an instance number by a dash.

DETAILED DESCRIPTION

A quick relay communication protocol may be used by an initiating communication device (such as a wearable electronic device, e.g., a smart watch) and/or a recipient communication device (such as a companion electronic device to the wearable electronic device, e.g., a smart phone, a tablet computer or a laptop computer) to selectively communicates messages via different communication channels. Based on available connections and a communication constraint associated with a message (e.g., whether the message is eligible to be communicated through a cloud-based relay server), a processor executing a program module in an application layer in the initiating communication device may provide transmission instructions to an interface circuit in the initiating communication device, which transmits a message to the recipient communication device based on the transmission instructions.

For example, the available connections may include a Bluetooth connection with the recipient communication device, a Wi-Fi connection with the recipient communication device via an access point and/or a cloud-based connection with the recipient communication device via the relay server (which is sometimes referred to as a 'quick relay connection'). When there are currently no available connections and the message is eligible to be communicated through the cloud-based relay server, the processor may establish the cloud-based connection with the recipient communication device via the relay server. Moreover, when the message is eligible to be communicated through the cloud-based relay server and there is no currently available cloud-based connection, the processor may establish the cloud-based connection with the recipient communication device via the relay server. Furthermore, when the Wi-Fi connection is available, the Bluetooth connection is unavailable and the cloud-based connection to the recipient communication device via the relay server is unavailable, the message may be transmitted using the Wi-Fi connection. Additionally, when the Bluetooth connection is available, the message may be transmitted using Bluetooth.

In some embodiments, when the message includes control traffic for the cloud-based connection with the recipient communication device via the relay server, the message is transmitted using Wi-Fi. Alternatively, in some embodiments, when the message includes control traffic, the message is transmitted using the Wi-Fi connection and the cloud-based connection.

By selectively communicating messages, this communication technique may allow the initiating communication device and the recipient communication device to efficiently and reliably manage dequeuing of the messages. Moreover, the communication technique may dynamically adapt to changing communication constraints associated with the messages and/or for changes in the available connections. In these ways, the communication technique may include the flexibility and the robustness of the communication. Consequently, the communication technique may facilitate improved performance during the communication, such as reduced latency. This may allow the use of time-sensitive applications that are executing on the initiating communication device and/or the recipient communication device. Therefore, the communication technique may improve the user experience when using the initiating communication device and/or the recipient communication device.

Note that the communication by the initiating communication device and the recipient communication device in the quick relay communication protocol may be compatible with a variety of wireless communication protocols, such as: Bluetooth, an IEEE 802.11 standard, a cellular-telephone communication protocol and/or another wireless communication protocol. In the discussion that follows, Bluetooth, Wi-Fi communication with an access point and Wi-Fi communication with the access point that communicates with a cloud-based relay server using an IEEE 802.3 compatible communication protocol (which is sometimes referred to as 'Ethernet') is used as an illustration. However, the communication technique may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

The initiating communication device and/or the recipient communication device (either of which are sometimes referred to as an 'electronic device') can include hardware and/or software to support a wireless personal area network (WPAN) according to a WPAN communication protocol, such as those standardized by the Bluetooth Special Interest Group (in Kirkland, Wash.) and/or those developed by Apple Inc. (in Cupertino, Calif.) that are referred to as Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer (P2P) communication technique.

The electronic device, in some embodiments, can also operate as part of a wireless communication system, which can include a set of client devices, which can also be referred to as stations (STAs), client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via Ethernet.

Additionally, it should be understood that the electronic devices described herein may be configured as multi-mode wireless communication devices that are also capable of communicating via, e.g., different third generation (3G) and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'communication device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Note that the term 'configured to; is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the 'configured to' language include hardware (e.g., circuits, memory storing program instructions executable to implement the operation, etc.). Reciting that a unit/circuit/component is 'configured to' perform one or more tasks is expressly intended not to invoke interpretation under 35 U.S.C. § 112(f) for that unit/circuit/component.

We now describe embodiments of the communication technique. FIG. 1 presents a block diagram illustrating an example of electronic devices communicating wirelessly. One or more electronic devices 110 (such as one or more smart phones, laptop computers, notebook computers, tablets, smart watches, wearable devices, or other such electronic device(s)) may communicate with another of electronic devices 110 using Bluetooth (when these electronic devices are in range). Moreover, one or more of electronic devices 110 and one or more access points 112 may communicate wirelessly in a WLAN using an IEEE 802.11 communication protocol. Thus, one or more of electronic devices 110 may be associated with the same or different access points 112. For example, electronic devices 110 and access points 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include requests, responses or acknowledgments and/or additional information, such as data, as payloads). Note that access points 112 may provide access to a network, such as the Internet, (e.g., via an Ethernet protocol) and may be a physical access point or a virtual or 'software' access point that is implemented on a computer or an electronic device.

As described further below with reference to FIG. 9, electronic devices 110 and access points 112 may include subsystems, including any or all of a networking subsystem, a memory subsystem, and a processor subsystem. In addition, electronic devices 110 and access points 112 may include radios 114, e.g., in the networking subsystems. More generally, electronic devices 110 and access points 112 can be implemented as (or can be included within) any electronic devices with networking subsystems that enable electronic devices 110 and access points 112 to wirelessly communicate with one or more other electronic devices. This can include transmitting beacons on wireless channels to enable the electronic devices to make initial contact with or to detect each other, followed by exchanging subsequent data/management frames (such as requests, responses or acknowledgments) to establish a connection, configure security options (e.g., IPSec), transmit and receive packets or frames via the connection, etc.

As can be seen in FIG. 1, wireless signals 116 are communicated by radios 114-1 and 114-4 in electronic device 110-1 and access point 112-2, respectively. More generally, one or more of electronic devices 110 and/or access points 112 may exchange frames using a Wi-Fi communication protocol in a WLAN. As described further below with reference to FIGS. 2-8, electronic device 110-1 (which is sometimes referred to as a 'wearable electronic device' or an 'initiating communication device') and electronic device 110-2 (which is sometimes referred to as a 'companion electronic device' or a 'recipient communication device') may communicate packets or messages with one or more access points 112. Moreover, the one or more access points 112 may communicate, via network 118, the packets or messages to intermediate server 120, allocation server 122 and/or one or more relay servers (such as relay server 124) using Ethernet. Furthermore, relay server 124 may implement a quick relay communication protocol to efficiently establish a communication session between electronic device 110-1, relay server 124 and electronic device 110-2.

In these ways, the communication technique may facilitate improved and efficient communication between electronic devices 110-1 and 110-2 even when electronic devices 110-1 and 110-2 are not proximate to each other (such as when they are not within Bluetooth communication range). This capability may improve the performance of time-sensitive applications (such as video streaming, gaming, etc.) that are executing on electronic devices 110-1 and 110-2.

In the described embodiments, processing a packet or frame in one of electronic devices 110 and/or one of access points 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metrics may include any/all of: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more, fewer, and/or different electronic devices. As another example, in other embodiments, different electronic devices can be transmitting and/or receiving packets or frames.

Figure 2:
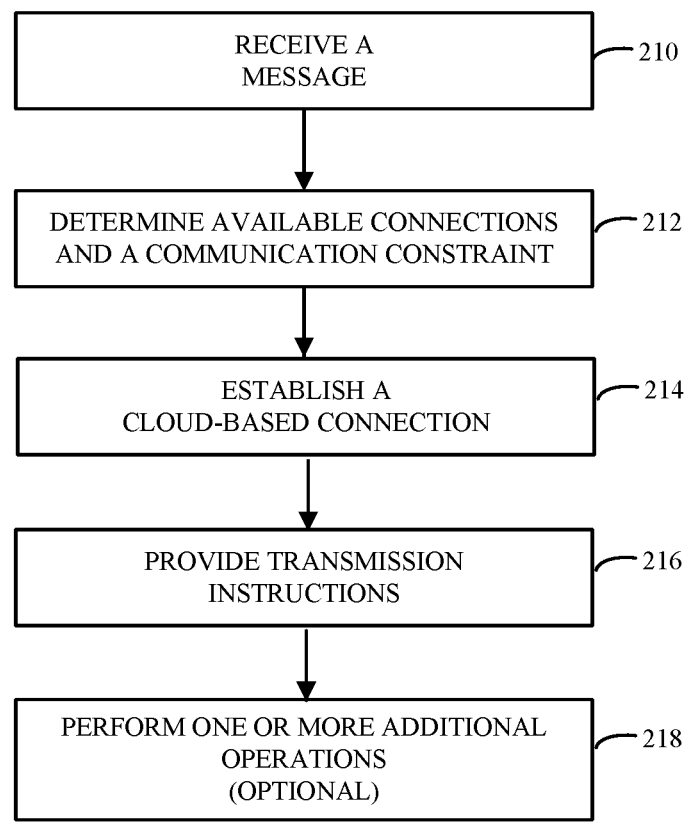
FIG. 2 is a flow diagram illustrating an example of a method for selectively communicating a message using at least some of the electronic devices in FIG. 1.

FIG. 2 presents a flow diagram illustrating an example method 200 for selectively communicating a message. This method may be performed by an initiating communication device or an electronic device, such as electronic device 110-1 in FIG. 1. For example, a processor executing a program module in an application layer in the initiating communication device may perform at least some of the operations in method 200. However, in some embodiments method 200 is performed by the recipient communication device.

During operation, the initiating communication device may receive a message (operation 210) from a queue in the initiating communication device. Then, the initiating communication device may determine available connections (operation 212) to an interface circuit in the initiating communication device and a communication constraint (operation 212) associated with the message. Based on the available connections and the communication constraint, the initiating communication device may provide transmission instructions (operation 216) to the interface circuit, which transmits the message to a recipient communication device based on the transmission instructions.

For example, the communication constraint may include whether the message is eligible to be communicated through a cloud-based relay server. When the message is not eligible to be communicated through a cloud-based connection via the relay server, the message may be transmitted to the recipient communication device using a different connection than via the relay server. In some embodiments, the different connection includes a local interface, such as a Bluetooth connection or a Wi-Fi connection via an access point.

Moreover, the available connections may include the Bluetooth connection with the recipient communication device, the Wi-Fi connection with the recipient communication device via the access point and/or the cloud-based connection with the recipient communication device via a relay server. When there are currently no available connections and the message is eligible to be communicated through the cloud-based relay server, the initiating communication device may establish the cloud-based connection (operation 214) with the recipient communication device via the relay server. Alternatively, when the Wi-Fi connection is available, the Bluetooth connection is unavailable and the cloud-based connection to the recipient communication device via the relay server is unavailable, the message may be transmitted using the Wi-Fi connection. Furthermore, when the Bluetooth connection is available, the message may be transmitted using Bluetooth. Additionally, when the message is eligible to be communicated through the cloud-based relay server and there is no currently available cloud-based connection, the initiating communication device may establish the cloud-based connection (operation 214) with the recipient communication device via the relay server.

In some embodiments, when the message includes control traffic for the cloud-based connection with the recipient communication device via the relay server, the message is transmitted using Wi-Fi. Alternatively, in some embodiments, when the message includes the control traffic, the message may be transmitted using the cloud-based connection and one of the Wi-Fi connection and the Bluetooth connection.

Moreover, the initiating communication device optionally performs one or more additional operations (operation 218). For example, using the cloud-based connection, the initiating communication device may send first data to and/or receive second data from the recipient communication device via the relay server.

Note that establishing the cloud-based connection may include performing the operations of: transmitting, to an allocation server, an allocate request for allocation of the relay server; receiving, from the allocation server, an allocate response with information identifying the relay server (such as an address of the relay server); transmitting, to the relay server, a binding request to bind the initiating communication device and the relay server in the cloud-based connection; and receiving, from the relay server, a binding response.

Moreover, the allocate request may be communicated to the allocation server via an intermediate server. In some embodiments, prior to transmitting the allocate request, the initiating communication device sends, to the intermediate server, an invitation request to establish a communication session via the relay server. Furthermore, the binding request may specify a transport type for a connection between the initiating communication device and the relay server in the communication session and/or the binding response may specify a channel number for the communication session. Additionally, the first connection indication for the communication session may specify the transport type and a radio access technology.

Furthermore, after a time interval without communication with the recipient communication device via the relay server (such as at least 10-30 s), the initiating communication device may transmit a keep-alive message to the relay server.

Additionally, the initiating communication device may discontinue the communication session by transmitting, to the relay server, a disconnect request. For example, after a time interval without communication with the recipient communication device via the relay server (such as at least 20-50 s), the initiating communication device may transmit a bring-down command to relay server, which forwards the bring-down command to the recipient communication device.

In some embodiments, at least some of the operations in method 200 are performed by processors in the access point, the relay server or the electronic devices. For example, at least some of the operations may be performed by a processor that executes a program module or software in an application layer and/or an interface circuit (such as such as firmware associated with a Media Access Control (MAC) layer, as well as one or more circuits in a physical layer) in the access point, the relay server or the electronic device.

Representative Embodiments

As an illustration of the communication technique, a wearable electronic device (such as a smart watch) and a companion electronic device (such as a smart phone) may be capable of communicating with each other using Bluetooth, Wi-Fi and/or cloud-based messaging. Note that the wearable electronic device may be used by a first user and the companion electronic device may be used by a second user, who may be the same as or different from the first user (such as people in the same family). Moreover, note that a companion electronic device-wearable electronic device relationship may mean that it is desired for these devices to share information with each other so that they have common, coordinated or synchronized user data on both devices, such as communication data (emails, texts), media (e.g., songs, images, one-way screen sharing and/or videos), etc. The companion electronic device-wearable electronic device relationship may also mean that the companion electronic device may have the ability to control at least certain aspects of the wearable electronic device, such as the companion electronic device being able to act as a communication proxy for the wearable electronic device or being able to perform management duties (such as data entry and registration) for the accessory device.

For example, the wearable electronic device and the companion electronic device may communicate messages to each other to share information, such as emails, text messages, calendar information, media library items, voice conversations, video, etc. This communication may occur through the use of one or more pipes, e.g., multiple communication mechanisms. Notably, messages may be routed between the wearable electronic device and the companion electronic device may when these devices are directly connected (e.g., via a Bluetooth connection) and when the devices are connected to a common network infra-structure device, such as a Wi-Fi connection via a common access point. When these direct and/or common infra-structure connections are unavailable, the wearable electronic device and the companion electronic device may communicate messages between them using a relay server (so long as there is not a communication constraint, i.e., so long as a message is eligible for cloud-based communication). In some embodiments, the communication via the relay server may involve establishing links between the wearable electronic device and the relay server, and between the relay server and the companion electronic device (which is sometimes referred to as 'establishing a communication session'). This cloud-based communication may enable the wearable electronic device and the companion electronic device to share messages even when they are physically distant from each other. Thus, if a user walks to a coffee shop with his smart phone, and leaves his smart watch at home (or vice versa), the smart phone and the smart watch may be able to communicate messages with each other via the relay server.

Furthermore, when the Wi-Fi connection is available, the Bluetooth connection is unavailable, a message may be transmitted using the Wi-Fi connection and the cloud-based connection to the recipient communication device via the relay server is unavailable. Additionally, when the Bluetooth connection is available, the message may be transmitted using Bluetooth. In some embodiments, when a message includes control traffic for the cloud-based connection with the recipient communication device via the relay server, the message is transmitted using Wi-Fi. Alternatively, in some embodiments, when a message includes the control traffic, the message is transmitted using the Wi-Fi connection and the cloud-based connection.

In order to facilitate establishing the communication session via the relay server in the communication technique, the wearable electronic device and the companion electronic device may each have been previously registered with at least a cloud-based server (such as the intermediate server), which facilitates communication among the wearable electronic device, the allocation server, the relay server and/or the companion electronic device. For example, the registration may be associated with a cloud-based account of one or more users, such as an owner of the wearable electronic device and/or the companion electronic device. In some embodiments, one of the wearable electronic device and the companion electronic device is registered with the cloud-based server, and the other of the wearable electronic device and the companion electronic device may, by virtue of its pairing with the registered device, may be automatically registered to the same cloud-based account.

We now describe embodiments of the communication protocol in the communication technique. During the communication technique, a link layer may notify an upper layer (such as the application layer) one or more link-status flags, including: isNearby, which indicates whether a Bluetooth link or connection is connected; isConnected, which indicates whether the Bluetooth connection or a Wi-Fi connection is connected; and/or isCloudConnected, which indicates whether a cloud-based connection is connected. The link-status flags may be used by the program module to determine the transmission instructions. For example, the program module may implement a message-enqueue technique.

Table 1 presents an example of a message-enqueue technique that is used by a given communication device. If the message is not allowed to be communication using a cloud-based connection (e.g., some messages cannot be delivered over the cloud because of security concerns), a local-message connection may be used to transmit a message. Thus, in this case, the transmit instructions may include providing the message to a queue for a Bluetooth interface circuit or a Wi-Fi interface circuit. Alternatively, if the message is allowed to be communicated via a cloud-based connection, then a local-message connection is used if it is available. However, if the local-message connection is not available, the message may be communicated via the cloud-based connection. And, if there cloud-based connection does not currently exist, then the cloud-based connection may be established (i.e., a communication session with a recipient communication device via a relay server may be established).

TABLE 1 if (message is allowed over a cloud-based connection)
  if (isConnected)
    enqueue local-message connection;
  else
    enqueue cloud-message connection;
  if (!isCloudConnected)

TABLE 1-continued bring up cloud-based connection;
  endif;
 endif;
else
  enqueue local-message connection;
endif;

If all three link-status flags are no, then the given communication device may bring-up a cloud-based connection. In general, this series of command operations can be performed by the initiating communication device or the recipient communication device. In the discussion that follows, the initiating communication device is used as an illustrative example.

Figure 3:
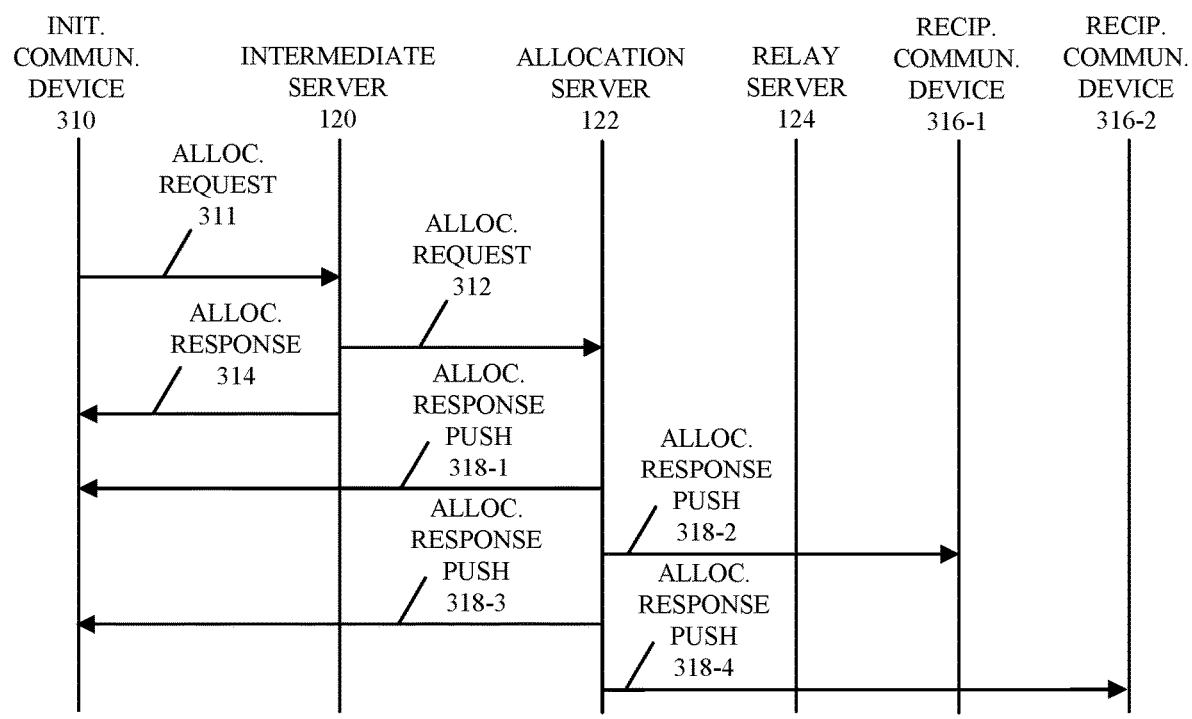
FIG. 3 is a flow diagram illustrating an allocation operation during communication among at least some of the electronic devices in FIG. 1.

FIG. 3 presents a flow diagram illustrating an allocation operation during communication among at least some of the electronic devices in FIG. 1. During the allocation operation, initiating communication device 310 may transmit an allocation request 311 (which may also be referred to as an 'allocate request') to intermediate server 120, which then sends an allocate request 312 to allocation server 122 and an allocate response 314 to initiating communication device 310. In response to allocate request 312, allocation server 122 may transmit one or more allocate response push 318 messages (which are sometimes referred to as an 'allocate responses') to initiating communication device 310 and/or one or more allocate response push 318 messages to recipient communication devices 316, e.g., to recipient communication devices 316-1 and 316-2. In some cases, each pair of allocate response push messages corresponds to a different recipient communication device 316, e.g., allocate response push messages 318-1 and 318-2 correspond to recipient communication device 316-1, while allocate response push messages 318-3 and 318-4 correspond to recipient communication device 316-2. Note that the one or more allocate response push messages 318 may include information, such as: a relay-server address, a relay-session identifier, a relay-session key (e.g., an encryption key or a secure hashing function), and/or a relay-session token. In some embodiments, initiating communication device 310 may start establishing a communication session by performing an invitation operation prior to the allocation operation.

For example, a processor executing a program module or software in initiating communication device 310 may instruct an interface circuit in initiating communication device 310 to transmit allocate request 312. This may occur when initiating communication device 310 is unable to directly communicate with recipient communication device 316 (e.g., using Bluetooth) or via a common infra-structure access point (e.g., using Wi-Fi), based on a type of message or data being communication (e.g., based on a communication constraint or whether the data includes control traffic), based on message permissions (e.g., a message priority), based on resource constraints (e.g., residual battery power in initiating communication device 310) and/or based on communication performance. Note that initiating communication device 310 and recipient communication device 316 may be pre-registered with intermediate server 120, e.g., intermediate server 120 may maintain user accounts or cloud-based accounts with information such as the locations or addresses of initiating communication device 310 and recipient communication device 316, as well as those of allocation server 122 and relay servers 124.

Figure 4:
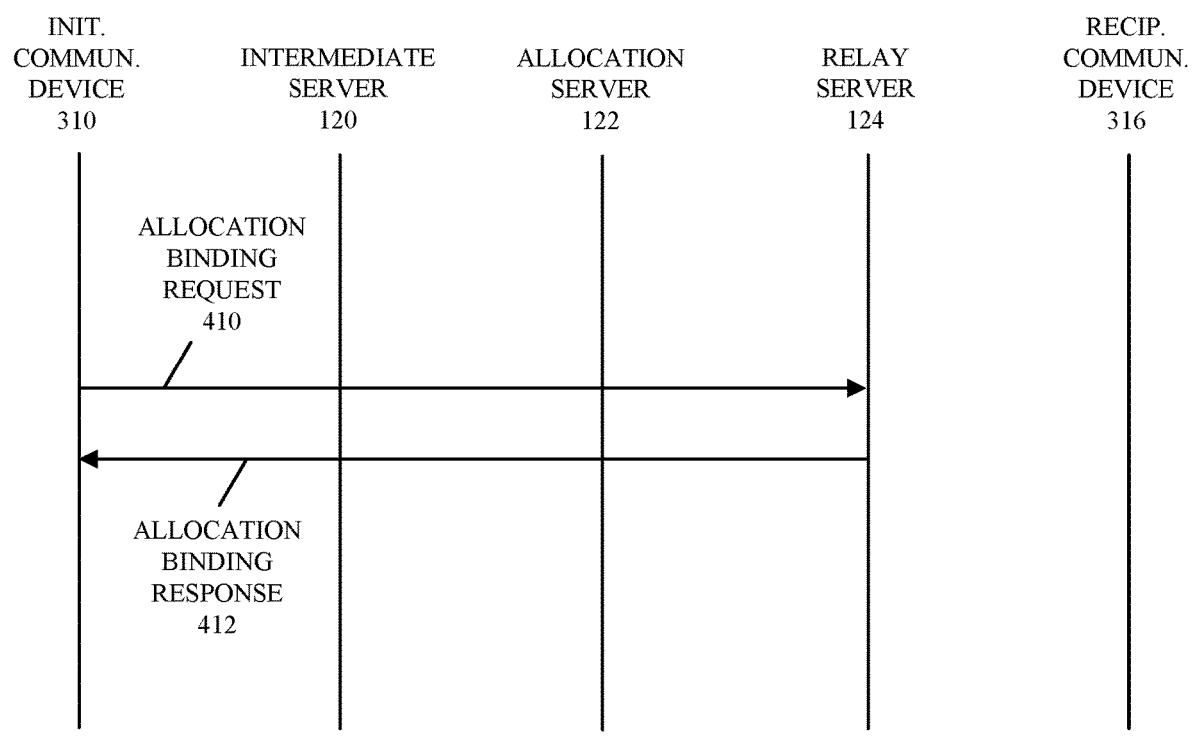
FIG. 4 is a flow diagram illustrating an allocation-binding operation during communication among at least some of the electronic devices in FIG. 1.

Then, an allocation-binding operation may be performed. This is shown in FIG. 4, which presents a flow diagram illustrating an allocation-binding operation during communication among at least some of the electronic devices in FIG. 1. During the allocation-binding operation, initiating communication device 310 may send an allocation binding request 410, e.g., an 'AllocBind Request', to relay server 124 using the relay-server address to bind initiating communication device 310 and relay server 124 in the communication session. This allocation binding request may include information such as: a requested transport type (e.g., User Datagram Protocol or UDP), message-integrity information (e.g., the relay-session key, which may include or specify a secure hashing function, such as SHA-20), the relay-session token, optional software and/or optional data. In response, relay server 124 may transmit an allocation binding response 412, e.g., an 'AllocBind Response', (which is sometimes referred to as a 'binding success response'). This allocation binding response may include information such as: a mapped address (e.g., an XOR-mapped address), a channel number, optional software and/or message-integrity information. For example, the channel number may be specified using a 4 B header, with 2 B for the channel number and 2 B for the length. However, a wide variety of data formats and/or lengths may be used for the channel number. Note that the allocation binding may reserve resources for or set up a connection between initiating communication device 310 and relay server 124 for use in the communication session.

Figure 5:
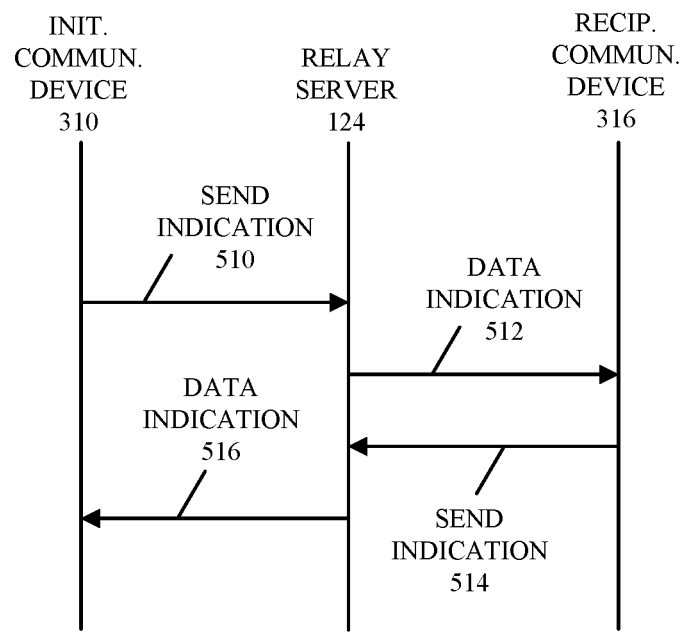
FIG. 5 is a flow diagram illustrating a session-connected-initiation operation during communication among at least some of the electronic devices in FIG. 1.

If the allocation-binding operation is successful and a connection has been established between initiating communication device 310 and relay server 124, a session-connected-acknowledgment operation may be performed. This is shown in FIG. 5, which presents a flow diagram illustrating a session-connected-acknowledgment operation during communication among at least some of the electronic devices in FIG. 1. During the session-connected-acknowledgment operation, initiating communication device 310 may transmit send indication 510 to relay server 124 using the relay-server address. Then, relay server 124 may send a data indication 512 to recipient communication device 316. In response, recipient communication device 316 may transmit, to relay server 124, send indication 514 (which is sometimes referred to as a 'session-connected response') to acknowledge that recipient communication device 316 is connected. After receiving send indication 514, relay server 124 may send data indication 516 (which is also sometimes referred to as a 'session-connected response') to initiating communication device 310 to confirm a connection between recipient communication device 316 and relay server 124 in the communication session, and thus to indicate that the communication session has been established.

After the communication session (and, thus, the cloud-based connection) has been established, the isCloudConnected link-stats flag may be set to 'Yes' by the link layer in the initiating communication device. Next, the program module executing in the application layer may perform message or packet-tagging operations for control traffic (such as message with information as to how to set up the cloud-based connection) and messaging traffic.

Table 2 presents an example of a packet-tagging technique for control traffic that is used by a given communication device. After receiving a message or a packet, the connection may be determined and the message may be marked by setting one or more message flags. For example, if the message is used to set up the cloud-based relay (isControlConnection is 'Yes'), then isControlTraffic may be set to 'Yes' and isCloudEnabled (i.e., the communication constraint is that the message can be communicated via the relay server) is set to 'Yes.'

TABLE 2 if receive a message (such as a Transmission Control Protocol or TCP segment) from the operating-system kernel;
determine the corresponding connection;
mark the message;
if (isControlConnection)
   isControlTraffic = YES;
   isCloudEnabled = YES;
endif;

Alternatively, Table 3 presents an example of a packet-tagging technique for messaging traffic that is used by a given communication device. After receiving a message or a packet, the connection may be determined and the message may be marked by setting one or more message flags. For example, if the message is to be communicated via the relay server (isCloudEnabledConnection is set to 'Yes'), then isCloudEnabled (i.e., the communication constraint is that the message can be communicated via the relay server) is set to 'Yes.'

TABLE 3 if receive a message (such as a Transmission Control Protocol or TCP segment) from the operating-system kernel;
determine the corresponding connection;
mark the message;
if (isCloudEnabledConnection)
   isCloudEnabled = YES;
endif;

Next, the program module may perform a packet-handling technique to determine the transmission instructions. At least some of these operations may be performed at a lower level, such as in the link layer. Table 4 presents an example of a packet-handling technique for messaging traffic that is used by a given communication device. This packet-handling technique may used to determine which interface to use (i.e., the cloud-based connection versus a local interface, such as the Bluetooth connection or the Wi-Fi connection). For example, if the Bluetooth connection is available, it may be used. Otherwise, if the cloud-based connection is available, it may be used. However, if the message includes control traffic, the Wi-Fi connection may be used. Alternatively, if the cloud-based connection is unavailable, the Wi-Fi connection may be used. And, if the Wi-Fi connection is unavailable, the message or packet may be dropped. In some embodiments, with control traffic, the message is communication using the cloud-based connection and a local interface (e.g., Bluetooth or Wi-Fi) to ensure receipt even if there is no Internet service available.

TABLE 4 if (isNearby)
   use the Bluetooth connection;
else
   if (isCloudEnabled)
      use the cloud-based connection;
      if (isControlTraffic)
         use the Wi-Fi connection;
      endif;
      else
         if (isConnected)
            use the Wi-Fi connection;
         else TABLE 4-continued

```
        drop packet;
      endif;
    endif;
  endif;
```

Figure 6:
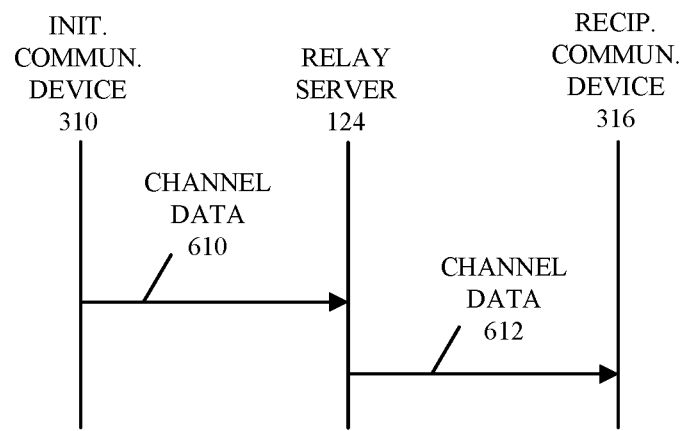
FIG. 6 is a flow diagram illustrating a sending-data operation during communication among at least some of the electronic devices in FIG. 1.

Once the communication session has been established, either of initiating communication device 310 and recipient communication device 316 can use the communication session to communicate data or information via relay server 124. For example, as shown in FIG. 6, which presents a flow diagram illustrating a sending-data operation during communication among at least some of the electronic devices in FIG. 1. During the sending-data operation, initiating communication device 310 may transmit channel data 610 to relay server 124 using the relay-server address. Then, relay server 124 may send channel data 612 to recipient communication device 316.

Figure 7:
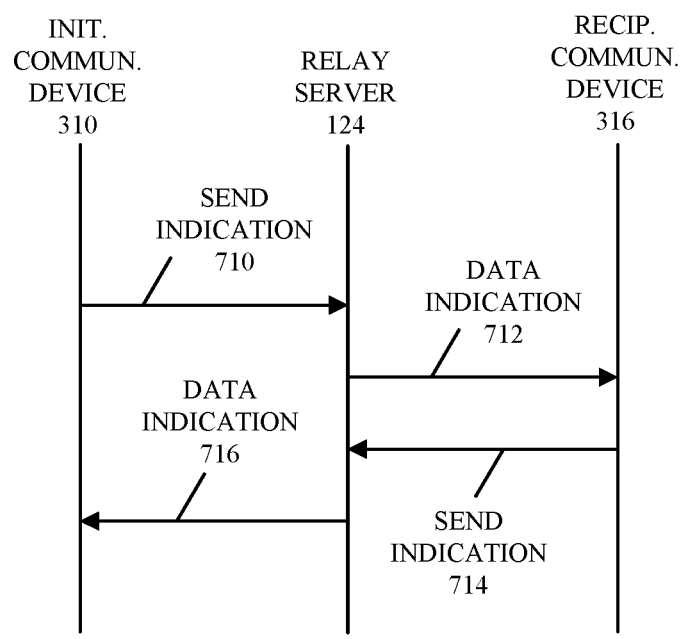
FIG. 7 is a flow diagram illustrating a keep-alive operation during communication among at least some of the electronic devices in FIG. 1.

In some embodiments, either of initiating communication device 310 or recipient communication device 316 may perform a keep-alive operation after a time interval (such as 10-30 s, e.g., 20 s) without activity in the communication session to keep the communication-session alive. This is shown in FIG. 7, which presents a flow diagram illustrating a keep-alive operation during communication among at least some of the electronic devices in FIG. 1. During the keep-alive operation, initiating communication device 310 may transmit, to relay server 124-1, a send indication 710 with an idle heartbeat request. In response, relay server 124-1 may send, to recipient communication device 316, a data indication 712 with the idle heartbeat request. Alternatively or additionally, recipient communication device 316 may transmit, to relay server 124-1, a send indication 714 with an idle heartbeat request. In response, relay server 124-1 may send, to initiating communication device 310, a data indication 716 with the idle heartbeat request. Note that the operations during the keep-alive operation may be repeated for as long as it is desirable to maintain the communication session.

Moreover, initiating communication device 310 and/or recipient communication device 316 may discontinue or bring down a cloud-based connection. For example, after a time interval (such as 10-50 s, e.g., 30 s) without activity in the communication session, a given communication device may bring down the cloud-based connection to save power. However, the cloud-based connection may only be discontinued if a local interface is connected, such as Bluetooth using Transmission Control Protocol (TCP) or Wi-Fi using User Datagram Protocol (UDP).

Figure 8:
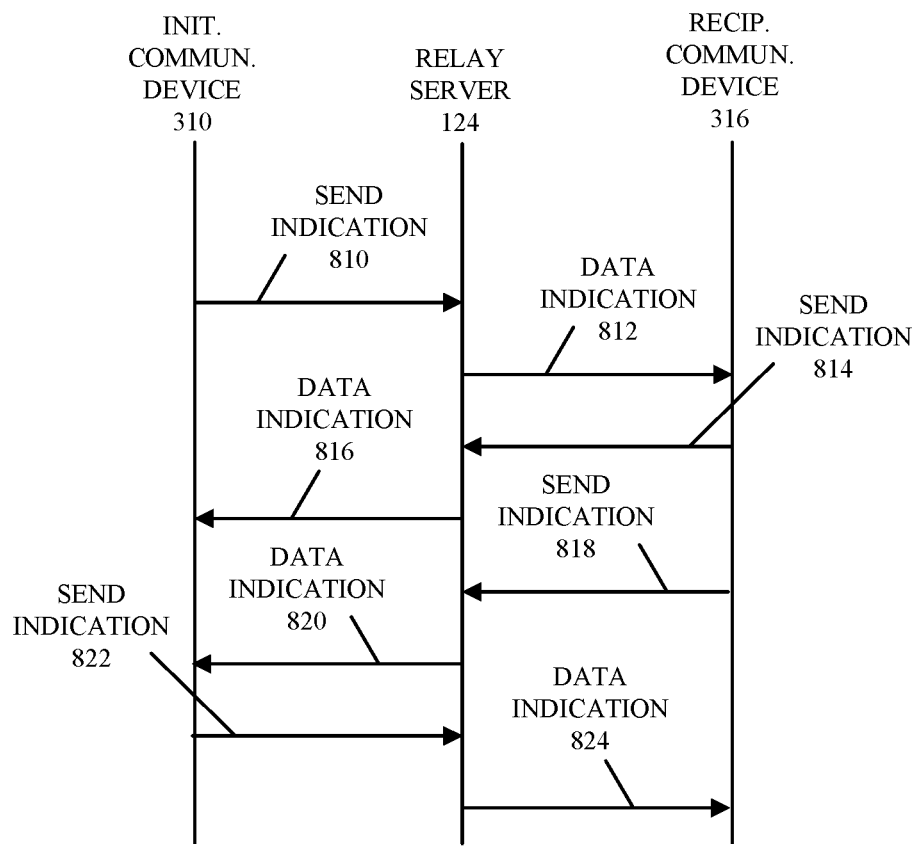
FIG. 8 is a flow diagram illustrating a bring-down operation during communication among at least some of the electronic devices in FIG. 1.

This is shown in FIG. 8, which presents a flow diagram illustrating a bring-down operation during communication among at least some of the electronic devices in FIG. 1. During the bring-down operation, initiating communication device 310 may transmit, to relay server 124-1, a send indication 810 that indicates that initiating communication device 310 is disconnected. In response, relay server 124-1 may send, to recipient communication device 316, a data indication 812 with the disconnect request. Moreover, recipient communication device 316 may transmit, to relay server 124-1, a send indication 814 with a disconnect acknowledgment. Next, relay server 124-1 may send, to initiating communication device 310, a data indication 816 with the disconnect acknowledgment.

Alternatively or additionally, recipient communication device 316 may transmit, to relay server 124-1, a send indication 818 that indicates that recipient communication device 316 is disconnected. In response, relay server 124-1 may send, to initiating communication device 310, a data indication 820 with the disconnect request. Moreover, initiating communication device 310 may transmit, to relay server 124-1, a send indication 822 with a disconnect acknowledgment. Next, relay server 124-1 may send, to recipient communication device 316, a data indication 824 with the disconnect acknowledgment.

We now describe embodiments of an electronic device. FIG. 9 presents a block diagram of an electronic device 900 (which may be an access point, another electronic device, such as a station, an initiating communication device or a recipient communication device) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: one or more program modules or sets of instructions (such as program module 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
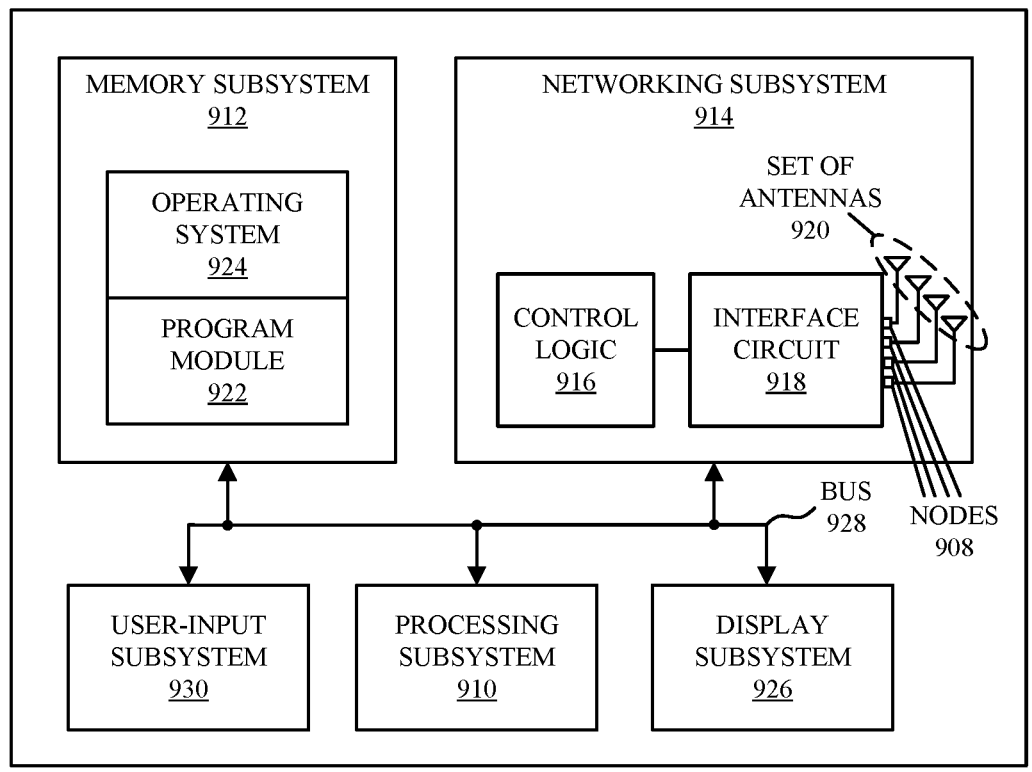
FIG. 9 is a block diagram illustrating an example electronic device, such as one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the sub systems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smart phone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program module 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication avoidance technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 922, operating system 924 (such as a driver for interface circuit 918) or in firmware in interface circuit 918. Alternatively or additionally, at least some of the operations in the communication technique may be implemented in a physical layer, such as hardware in interface circuit 918. In some embodiments, the communication avoidance technique is implemented, at least in part, in a MAC layer and/or in a physical layer in interface circuit 918.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for selectively communicating messages via different communication channels, the method comprising, by a relay server:
    receiving a request to establish a cloud-based connection between an initiating device and a recipient device, wherein the request is issued when:
        the initiating device has a message to send to the recipient device,
        a message flag associated with the message indicates that the message is authorized to be communicated via cloud-based connections, and
        a link-status flag managed by the initiating device indicates that a local-based connection is unavailable to the initiating device;
    establishing the cloud-based connection between the initiating device and the recipient device by forming respective communication sessions with the initiating device and the recipient device;
    receiving the message from the initiating device; and
    transmitting the message to the recipient device using the respective communication session with the recipient device.

2. The method of claim 1, wherein other messages that are not authorized to be communicated via cloud-based connections are transmitted to the recipient device using a different connection than the cloud-based connection.

3. The method of claim 1, wherein the relay server is communicatively coupled with an intermediate server and allocation server that provide information associated with the relay server to the initiating device.

4. The method of claim 1, further comprising:
    receiving a send indication from the initiating device, wherein the send indication pertains to a bring-down operation and indicates the initiating device is requesting to disconnect from the cloud-based connection;
    transmitting, to the recipient device, a data indication pertaining to the bring-down operation;
    receiving, from the recipient device, a disconnect acknowledgement; and
    transmitting, to the initiating device, the disconnect acknowledgment.

5. The method of claim 1, further comprising:
    receiving, from the initiating device, a send indication comprising an idle heartbeat request pertaining to a keep-alive operation; and
    transmitting, to the recipient device, a data indication comprising the idle heartbeat request pertaining to the keep-alive operation.

6. The method of claim 5, wherein the send indication is received after an expiration of a time interval.

7. The method of claim 1, wherein, when a Bluetooth connection between the initiating device and the recipient device is available, the message is transmitted using the Bluetooth connection.

8. A relay server, comprising:
    at least one processor; and
    at least one memory storing instructions that, when executed by the at least one processor, cause the relay server to carry out steps that include:
        receiving a request to establish a cloud-based connection between an initiating device and a recipient device, wherein the request is issued when:
            the initiating device has a message to send to the recipient device,
            a message flag associated with the message indicates that the message is authorized to be communicated via cloud-based connections, and
            a link-status flag managed by the initiating device indicates that a local-based connection is unavailable to the initiating device;
        establishing the cloud-based connection between the initiating device and the recipient device by forming respective communication sessions with the initiating device and the recipient device;
        receiving the message from the initiating device; and
        transmitting the message to the recipient device using the respective communication session with the recipient device.

9. The relay server of claim 8, wherein other messages that are not authorized to be communicated via cloud-based connections are transmitted to the recipient device using a different connection than the cloud-based connection.

10. The relay server of claim 8, wherein the relay server is communicatively coupled with an intermediate server and allocation server that provide information associated with the relay server to the initiating device.

11. The relay server of claim 8, wherein the steps further include:
receiving a send indication from the initiating device, wherein the send indication pertains to a bring-down operation and indicates the initiating device is requesting to disconnect from the cloud-based connection;
transmitting, to the recipient device, a data indication pertaining to the bring-down operation;
receiving, from the recipient device, a disconnect acknowledgement; and
transmitting, to the initiating device, the disconnect acknowledgment.

12. The relay server of claim 8, wherein steps further include:
receiving, from the initiating device, a send indication comprising an idle heartbeat request pertaining to a keep-alive operation; and
transmitting, to the recipient device, a data indication comprising the idle heartbeat request pertaining to the keep-alive operation.

13. The relay server of claim 12, wherein the send indication is received after an expiration of a time interval.

14. The relay server of claim 8, wherein, when a Bluetooth connection between the initiating device and the recipient device is available, the message is transmitted using the Bluetooth connection.

15. At least one non-transitory computer-readable storage medium storing instructions that, when executed by at least one processor included in a relay server, cause the relay server to perform steps that include:
receiving a request to establish a cloud-based connection between an initiating device and a recipient device, wherein the request is issued when:
the initiating device has a message to send to the recipient device,
a message flag associated with the message indicates that the message is authorized to be communicated via cloud-based connections, and
a link-status flag managed by the initiating device indicates that a local-based connection is unavailable to the initiating device;
establishing the cloud-based connection between the initiating device and the recipient device by forming respective communication sessions with the initiating device and the recipient device;
receiving the message from the initiating device; and
transmitting the message to the recipient device using the respective communication session with the recipient device.

16. The at least one non-transitory computer-readable storage medium of claim 15, wherein other messages that are not authorized to be communicated via cloud-based connections are transmitted to the recipient device using a different connection than the cloud-based connection.

17. The at least one non-transitory computer-readable storage medium of claim 15, wherein the relay server is communicatively coupled with an intermediate server and allocation server that provide information associated with the relay server to the initiating device.

18. The at least one non-transitory computer-readable storage medium of claim 15, wherein the steps further include:
receiving a send indication from the initiating device, wherein the send indication pertains to a bring-down operation and indicates the initiating device is requesting to disconnect from the cloud-based connection;
transmitting, to the recipient device, a data indication pertaining to the bring-down operation;
receiving, from the recipient device, a disconnect acknowledgement; and
transmitting, to the initiating device, the disconnect acknowledgment.

19. The at least one non-transitory computer-readable storage medium of claim 15, wherein the steps further include:
receiving, from the initiating device, a send indication comprising an idle heartbeat request pertaining to a keep-alive operation; and
transmitting, to the recipient device, a data indication comprising the idle heartbeat request pertaining to the keep-alive operation.

20. The at least one non-transitory computer-readable storage medium of claim 15, wherein, when a Bluetooth connection between the initiating device and the recipient device is available, the message is transmitted using the Bluetooth connection.

* * * * *

UNITED STATES PATENT AND TRADEMARK OFFICE
CERTIFICATE OF CORRECTION

PATENT NO. : 11,496,576 B2  
APPLICATION NO. : 17/027639  
DATED : November 8, 2022  
INVENTOR(S) : Yan Yang et al.

Page 1 of 1

It is certified that error appears in the above-identified patent and that said Letters Patent is hereby corrected as shown below:

In the Specification

At Column 17, Line 44: "optical connections among the sub systems." should read -- optical connections among the subsystems. --.

Signed and Sealed this  
Third Day of October, 2023

Katherine Kelly Vidal  
*Director of the United States Patent and Trademark Office*